Patented Nov. 24, 1931

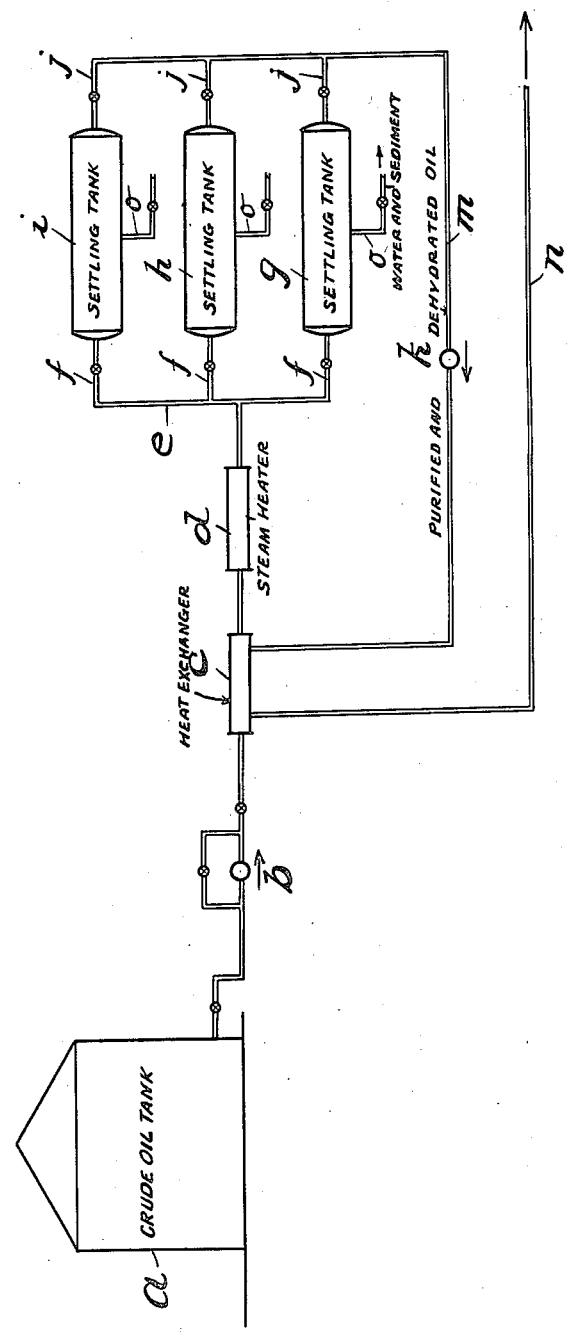

1,833,618

UNITED STATES PATENT OFFICE

ARTHUR E. PEW, JR., OF BRYN MAWR, PENNSYLVANIA, ASSIGNOR TO SUN OIL COMPANY, OF PHILADELPHIA, PENNSYLVANIA, A CORPORATION OF NEW JERSEY

PROCESS OF DEHYDRATING AND PURIFYING OIL

Application filed June 14, 1927. Serial No. 198,763.

Crude oil, as it is produced from many fields, contains water, salt water, sand and dirt, free and in emulsion, commonly known as "B. S." or "bottom settling". Such oil is not generally acceptable to operators of pipe lines or to other purchasing agencies unless the "B. S." and water are reduced to less than two per cent.

Crude oil containing salt water and sediment is a source of great trouble in refining processes, as the dirt plugs up the tubes of heat exchangers and pipe stills and also causes the bottom plates of cylindrical stills to get dirty, resulting in hot spots and carbon accumulations which eventually cause the steel to burn out, necessitating the installation of new plates or tubes. Corrosion, in many cases, is directly traceable to chlorine, formed in breaking up the salt water, combining with the condensed water to form diluted hydrochloric acid. These contaminating constituents of crude oil cause great expense to refineries and are the direct cause of many shutdowns of plants for cleaning and repairs. The conditions just mentioned are well known to be so serious as to render it uneconomical to run certain crudes (as, for example, South Texas heavy crudes and crudes from the Texas Panhandle) in pipe stills.

With a view to conditioning crude oil for refining operations, it is customary to treat the crude with chemicals before shipment, or to heat it, or "cook" it, with steam for the purpose of evaporating the water. Chemical treatment, although partially successful, is expensive and does not produce a satisfactory result, particularly in removing dirt, and many authorities assert that treatment with chemicals has a deleterious effect on products subsequently obtained from the crude thus treated. "Cooking" is extravagant, in that it involves loss of light oil vapors, and it is injurious in that it effects oxidation of the crude because of the effect thereon of air at temperatures necessary for dehydration, the oxidation causing poor colors to be obtained in the lubricating oil distillates of subsequent distillation. Another defect of the steaming or cooking procedure consists in the fact that the evaporation of the water content causes a concentration of salt from the salt water, which salt is substantially insoluble in the oil and thus later acts as above described in subsequent distillation.

Other methods for purifying crude oil, such as centrifuging, have been tried. Centrifuging removes dirt but is not successful in removing water to a satisfactory extent. Experimental centrifugal operations indicate that dehydration is effected, wholly or in large part, by such aeration of the crude as occurs in the necessary heating thereof prior to centrifugation. A practical objection to the centrifugal method of purification is that, unless an economically impracticable number of centrifugals are employed, it is impossible to treat large volumes of crude.

Oil has also been dehydrated by running it through a large tube, heating the oil in the course of its flow therethrough so as to vaporize the water and the more volatile constituents of the oil, condensing the oil and water vapors and separating the oil and water by gravity. In such a process, however, the chlorides are deposited in the oil and settle out in the still, necessitating frequent shutdowns for cleaning and shortening the life of the still.

It is also known to heat the oil under pressure in a tank and then cool, in the same tank, to ordinary atmospheric temperature and to then run the oil into a separate tank wherein the oil and water settle by gravity. But this process, besides being non-continuous, destroys the low viscosity which may have been previously secured and thereby destroys the conditions required for efficient settlement.

I have successfully dehydrated and purified crude oil in large volume, and have overcome all of the above objections, by means of the process embodying the present invention. Specifically, I have succeeded, by my process, in satisfactorily purifying 7,000 barrels of oil daily.

While the process is not dependent for its execution on my particular apparatus, the apparatus which I have employed, and prefer to employ, for carrying out the process is shown, in diagram, in the accompanying drawing.

The operation of the apparatus will be first described.

From a tank $a$, containing untreated crude oil, the oil is continuously pumped, by means of a pump $b$, through a heat exchanger $c$ and a steam heater $d$, to a manifold $e$, whence, through one of the valved pipes $f$ the oil flows into one of three settling tanks $g$, $h$ and $i$, say the tank $g$. When tank $g$ is filled, the oil flow thereinto is cut off and the oil therein is allowed to stand, and the water and sediment settle out. During settlement in tank $g$, the oil is pumped into tank $h$. After tank $h$ is filled, the oil flow thereinto is cut off and the oil therein is, in turn, allowed to stand, and oil is pumped into tank $i$. After settlement in tank $g$ is completed, which occurs before tank $h$ is completely filled, the water and dirt are drawn off the bottom of tank $g$ through valved pipes $o$. The drawing-off operation from tank $g$ is completed when tank $h$ is filled. As soon as the flow of oil into tank $h$ is cut off and diverted to tank $i$, pump $k$ draws oil from tank $g$ and forces it through line $m$ and heat exchanger $c$ and thence, by way of line $n$, to storage or to an oil still. Each tank is connected to pipe $m$ by means of a valved pipe $j$.

It will thus be understood that tank $g$ will be emptied and tank $i$ will be filled at about the same time, that just before this time, settlement in tank $h$ will have been completed and the water and sediment drawn off, and that immediately thereafter the flow of oil to tank $h$ will be cut off and diverted to tank $g$.

Thus, at any given time, oil is flowing into one tank, oil is standing in another tank (or the precipitated water and sediment are being drawn off therefrom), and purified and dehydrated oil is being withdrawn from still another tank; and the three operations occur successively in each tank, so that there need be no interruption in the flow of untreated crude.

The rate of flow will be regulated in accordance with the time required to effect settlement in each tank. The rate of flow may be multiplied, if desired, by increasing the number of tanks, so as to allow settlement to proceed simultaneously in two or more tanks. Thus, by providing four tanks, the oil in two of them may be allowed to stand while oil is being supplied to a third and withdrawn from a fourth, thereby doubling the permissible rate of inflow and outflow; or doubling the time for settlement with the same rate of inflow and outflow. The time required for settlement will vary with different crudes, as is hereinafter explained.

The separating tanks, flow lines and heat exchanger should be heavily insulated. By the use of the heat exchanger and insulation, the only heat lost is by radiation and that contained in the drawn off water, thereby making the process highly economical.

The process involves other features of importance that are entirely independent of the process so far as it has been described. It is necessary, in order to effect an entirely satisfactory dehydration and other purification, that the oil should be heated to a temperature that will reduce its viscosity to not above thirty-five seconds Saybolt.

It is also necessary, in order to successfully practice the process, to hold the oil under sufficient superatmospheric pressure to substantially prevent vaporization of water or light oil fractions. The pressure should not be less than at least two or three atmospheres absolute and should be ordinarily much in excess of this.

The factors of temperature, pressure and time of settlement required to produce the best results will so vary with different crudes that it is difficult or impossible to prescribe definite limits or ranges that will apply to all crudes.

As is well understood, the viscosity of an oil varies with temperature. For any given oil the viscosity is less in seconds Saybolt at a high temperature than at a low temperature. The relationship between the viscosities at two different temperatures varies in different oils. Regardless of the kind of oil, it should be heated to such a temperature that the viscosity will not be above 35 seconds. No fixed minimum workable temperature can be specified because it depends on the kind of oil being processed. For example, 36 gravity Oklahoma crude has a viscosity at 100° F. of 43 seconds Saybolt; at 120° F. the viscosity is 40 seconds. It would therefore be necessary to heat this oil to a temperature of about 200° F. to get a viscosity of 35 seconds. Vinton crude from Texas has a viscosity of 100° F. of about 280 seconds Saybolt and at 260° F. the viscosity is 40 seconds Saybolt. It would therefore be necessary to heat this oil to about 310° F. to get a viscosity of 35 seconds. Spindletop oil has a viscosity at 100° F. of 46 seconds Saybolt and a viscosity of 40 seconds at 130° F. It would therefore be necessary to heat this oil to about 190° F. to get the viscosity down to 35 seconds Saybolt.

It is desirable, in the practical operation of the process, to heat the oil to a temperature substantially higher than that required to reduce its viscosity to 35 seconds Saybolt. As examples of desirable temperatures, times and pressures with given crudes, it may be stated that in treating grade "A" Texas crude, it has been determined that a temperature of 310° F., a pressure of 75 pounds absolute, and one hour's settlement, give the desired results. On analysis, the treated oil showed no water or salt. The ash content showed the substantial removal of sand dirt. In treating Spindletop crude, a temperature of 280° F. and a pressure of 65 pounds absolute, with 50 minutes settling, effected satisfactory results.

The principal reasons for the desirable variation in these necessary factors is that different crudes contain varying percentages of water and "B. S." and are of different viscosities. It is believed, however, that any crude may be dehydrated and otherwise purified by my process if the temperature is such that the viscosity is not above about 35 seconds Saybolt, if the pressure is sufficient to prevent substantial vaporization, and if the time allowed for settling is over thirty minutes.

The advantages of the process may be summarized as follows:

(1) Prevention of vaporization of water or light oil fractions, by reason of pressure.

(2) Rupture of the interfacial film between the oil and water or "B. S." due to the combination of pressure and temperature.

(3) Promotion of settlement by reduction in viscosity, thus facilitating settlement of dirt due to difference in density and decreased friction factor.

(4) Removal of salt in solution with the water, due to the removal of the salt water under pressure.

(5) Preventing of oxidation, due to the whole system being closed against admission of air.

(6) Economy in heat consumption.

(7) Capacity to handle large volumes of crude.

(8) Adaptability to continuous or batch operation.

(9) Greatly increased length of time during which the subsequent distillation processes can be continuously used, due to the absence of hard salt and dirt deposits and the consequent avoidance of frequent shutdowns.

(10) Improvement in the quality of distillation products, such as fuel oil, and of residual oil and asphalt obtained in subsequent distillation, due to the low content of salt and foreign matter, resulting in a desirable low ash content.

It will be understood that, at the beginning of the process, all the heat required to raise the temperature of the crude oil is furnished by the heater $d$; but that, after the process has reached the stage at which the hot dehydrated oil is flowing back through line $m$ and heat exchanger $c$, the much greater proportion of the heat required to raise the temperature of the crude oil is furnished by heat exchange with the hot dehydrated oil; heater $d$ then acting only to supply the additional heat required to impart the desired temperature to the inflowing crude.

Having now fully described my invention, what I claim and desire to protect by Letters Patent is:

1. The process of dehydrating and removing sediment from mineral oil which comprises heating the oil to a temperature sufficient to reduce its viscosity to not above about 35 seconds Saybolt while subjecting it to a superatmospheric pressure sufficient to prevent substantial vaporization of water and light oil fractions, then flowing the oil into a settling chamber and therein, without substantial application of heat and while maintaining it at a temperature not materially below that specified and while continuing to subject it to said superatmospheric pressure, effecting precipitation of water and sediment from the oil, removing the water and sediment from the oil and removing the heated oil from the settling chamber.

2. The process of dehydrating and removing sediment from mineral oil which comprises heating the oil to a temperature sufficient to reduce its viscosity to not above 35 seconds Saybolt and then allowing the oil to settle, subjecting it during heating and settlement to a superatmospheric pressure sufficient to prevent substantial vaporization of water and light oil fractions, maintaining the oil during settlement at such temperature as to maintain the specified viscosity of the oil, and removing the heated low viscous purified and dehydrated oil from the settling chamber.

3. The process of dehydrating and removing sediment from mineral oil which comprises flowing it in a continuous stream of narrow cross-section through a heating zone wherein it is subjected to heat sufficient to materially reduce its viscosity to the degree required for settlement as hereinafter specified, while subjecting it to a superatmospheric pressure sufficient to prevent substantial vaporization of vapor and light oil fractions, then flowing the heated low viscous oil into a settling chamber and therein, while preventing such loss of heat as would materially increase its viscosity and while subjecting it to said superatmospheric pressure, effecting precipitation of water and sediment from the oil while the oil is prevented from remixing with the separated water and sediment and remains heated substantially above the temperature at which water freely vaporizes at atmospheric pressure, and then removing the heated low viscous purified and dehydrated oil from the settling chamber.

4. The process of dehydrating and removing sediment from mineral oil which comprises flowing oil through a confined path toward a series of settling loci, heating the oil to materially reduce its viscosity, delivering successive fractional parts of the oil of the flowing stream to the respective settling loci in endless rotation, applying superatmospheric pressure to the oil to substantially prevent vaporization during heating and delivery and during settlement in each locus, and withdrawing oil from one settling locus while settlement is proceeding at another settling locus and while oil is being delivered to still another settling locus.

5. The process of dehydrating and removing sediment from mineral oil which comprises flowing oil through a confined path toward a series of settling loci, heating the oil during its flow through said path to materially reduce its viscosity, delivering successive fractional parts of the oil of the flowing stream to the respective settling loci successively in endless rotation, allowing the oil to settle and withdrawing precipitated water and dirt at one locus while maintaining the oil sufficiently heated to maintain it in a low viscous state, and during such settlement withdrawing oil from another locus at which settlement and removal of precipitated matter has previously occurred and also delivering oil to still another locus, and subjecting the oil while flowing through said path and during settlement in each locus to a superatmospheric pressure sufficient to prevent substantial vaporization of water and light oil vapors.

6. The method of breaking an emulsion of hydrocarbon oil and water which comprises flowing the emulsion in a continuous stream of narrow cross-section under superatmospheric pressure through a heating zone and therein heating it to a temperature in excess of the boiling point of water at atmospheric pressure, passing the heated emulsion to a second zone and maintaining it under pressure in a quiescent state without evolution of vapors until separation into layers of oil and water takes place, and then withdrawing separately the oil and water layers from said second zone.

7. The method of breaking an emulsion of hydrocarbon oil and water which comprises continuously passing the emulsion through a coil in which it is heated to a predetermined temperature under sufficient pressure to prevent substantial vaporization, passing the heated emulsion successively into a series of closed settling vessels in each of which the emulsion is allowed to remain in a quiescent state without evolution of vapors until separation of the oil and water is effected, and subsequently withdrawing separately the oil and water from the several settling vessels.

8. The method of breaking an emulsion of hydrocarbon oil and water which comprises continuously passing the emulsion through a coil in which it is heated to a temperature in excess of the boiling point of water at atmospheric pressure under sufficient pressure to prevent substantial vaporization, passing the heated emulsion in predetermined quantities to a series of settling vessels in each of which the emulsion is allowed to remain in a quiescent state under the pressure of the vapors generated by the emulsion until separation of the oil and water is effected, and thereafter separately withdrawing from the several settling vessels the separated layers of oil and water.

In testimony of which invention, I have hereunto set my hand at Philadelphia, Pennsylvania, on this 2nd day of June, 1927.

ARTHUR E. PEW, JR.